July 24, 1934.   B. A. BRANCH ET AL   1,967,463
AUTOMOBILE SIGNAL
Filed Nov. 8, 1929
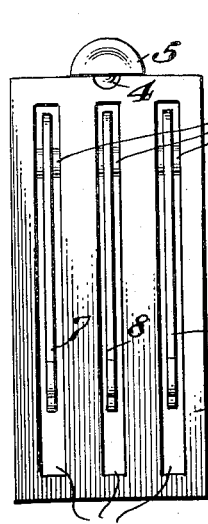
Fig.1.
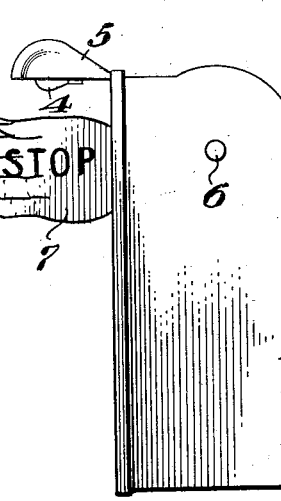
Fig.2.
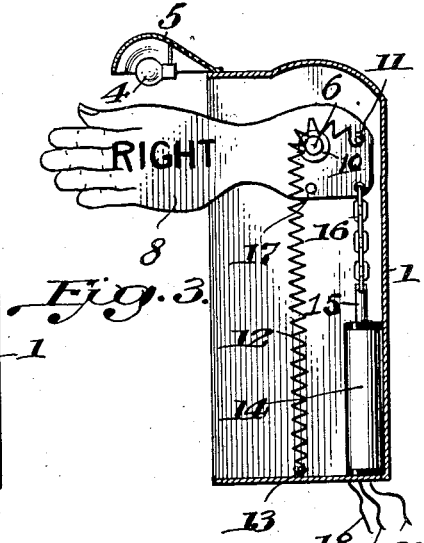
Fig.3.
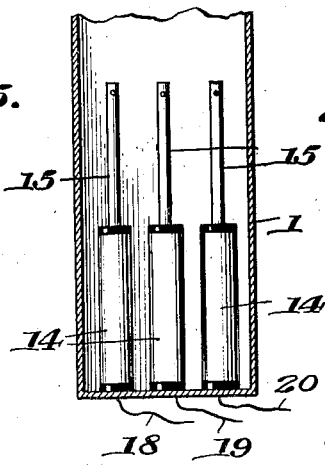
Fig.5.
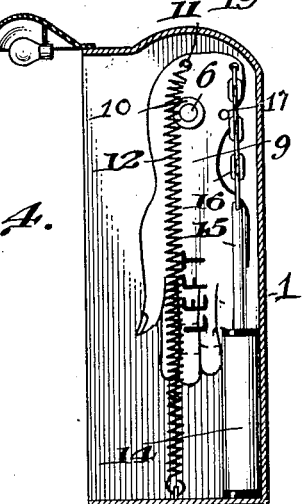
Fig.4.
Fig.7.
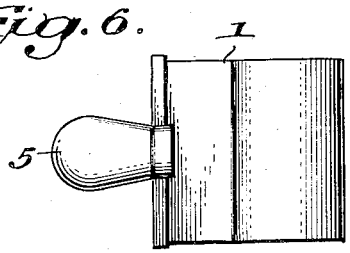
Fig.6.
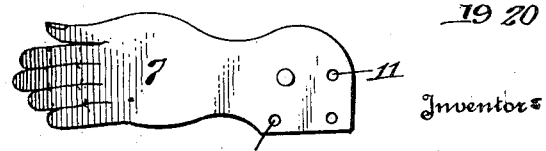
Inventors
Benjamin Alvin Branch
and
Francis Joseph Fella
By
Attorney Patented July 24, 1934

1,967,463

UNITED STATES PATENT OFFICE 1,967,463

AUTOMOBILE SIGNAL

Benjamin Alvin Branch, Rockport, and Francis Joseph Fella, Chrisney, Ind.

Application November 8, 1929, Serial No. 405,684

4 Claims. (Cl. 177—329)

The object of the present invention is to provide an improved signal, intended for use as a substitute for hand signaling, adapted for installation upon the rear or front or any other suitable place, of an automobile, whereby the driver when depressing the brake pedal, will automatically cause the operation of the "stop" signal and may, at will, operate the "right" turn and "left" turn signals by the use of electric push buttons or switches.

The principle of the invention is that of a pivotally mounted signal, such as an arrow or representation of a hand, spring retracting means cooperating with the signal and the signal pivot in an improved manner adapted to automatically restore it to normally obscured or retracted position, an electric solenoid, armature, and connection between the armature and the signal whereby the signal may be displayed, an improved stop device to limit the movement of the signal and which, specifically, comprises a stop on the signal adapted to engage the retracting spring; and suitable electrical connections whereby the "stop" signal is rendered operable by the brake pedal and the "right" and "left" signals are rendered operable by suitable electrical push buttons or switches; further, the combination of the respective signals and their independent operating means, including an improved housing, guides, and illuminating means, the complete signal being embodied in a single unit which may be installed on the body of the car or any fender or fenders thereof.

In the accompanying drawing:

Figure 1 is a front elevation of the complete signal, except for the electrical connections and electrical controlling devices;

Fig. 2 is a side elevation thereof, the "stop" signal being shown in its displayed position;

Fig. 3 is a vertical section through the housing showing one of the signals and its operating means, the signal being displayed;

Fig. 4 is a similar view showing another one of the signals, in its retracted or obscured position;

Fig. 5 is a vertical section through the housing showing the solenoids and their armatures, other parts being omitted;

Fig. 6 is a plan view of the appliance; and

Fig. 7 is a detail view of one of the signals.

The appliance has a shell or housing 1 comprising bottom, sides and rear wall, to which is connected removable front 2 having three slots 3. Carried by the top of the housing or shell 1 is an electric lamp 4 having a shade 5 and arranged so that the front 2 will be illuminated. The lamp 4 may receive its current from the battery of the automobile.

Any suitable means such as fastenings or brackets may be employed to attach the housing 1 to the body or fenders of the automobile.

Carried by the housing 1, is a shaft 6 on which are mounted three signals 7, 8, 9 in such manner that they can be swung outward into horizontal position, as shown in Figs. 2, 3, then extending through the slots 3, or be lowered and concealed within the housing 1, as shown in Fig. 4.

The slots 3 serve as guides for the signals 7, 8, 9 and prevent them from unduly vibrating.

The signals 7, 8, 9 may be in the form of arrows or representations of a hand, the latter shape being shown in the drawing. One of the signals, for instance 7, bears the word "stop"; another signal, for instance 8, bears the word "right"; the third signal, for instance 9, bears the word "left". Thus the three signals 7, 8, 9 are adapted to serve as stop signals and right and left hand turn signals, according to which one is used.

Each signal may be provided with a hub 10 to strengthen it at its pivotal point, as the signals may be of sheet metal or thin wood. The hubs 10 prevent damage at the pivotal points of the signals.

Any suitable means may be provided to prevent the pivotal parts of the signals from sliding along on the shaft 6.

While the "stop" signal 7 is intended to be automatically operated when the brake pedal of the automobile is depressed, so that a suitable signal will be given when the car is about to stop or when its motion is checked, the signals 8 and 9 are intended to be operated by electric push buttons or switches arranged conveniently to the driver.

The respective signals are operated by similar means, hence a description of one will suffice.

Connected to each signal at 11 at a point above the shaft 6 is a contractile coil spring 12 whose lower end is attached to the bottom of the housing 1 at 13. The spring 12 normally holds the signal in retracted or concealed position, within the housing 1, as shown in Fig. 4, hence all of the signals are concealed under normal conditions.

For each signal, there is a solenoid 14, the respective solenoids being secured in any suitable manner within the housing, as shown in Figs. 3, 4, 5. Each solenoid has an armature 15, the respective armatures being connected to the respective signals 7, 8, 9 by flexible connections such as chains 16. The point of connection of each chain 16 to the signal is such, in respect to the point of connection 11 of the spring 12 to the signal, that when the signal is in retracted position as shown in Fig. 4, the armature 15 is drawn out from the solenoid 14 by the action of spring 12. When the solenoid is energized, it draws in its armature 15, pulling upon the signal in opposition to the action of the spring 12 and drawing down the inner end of the signal and elevating the outer end thereof, causing the upper end of the spring 12 to be bent crosswise over the shaft 6. This action is limited by a stop 17 carried by the signal and arranged to engage the spring 12, one such stop being carried by each signal and adapted to engage the spring controlling that signal.

One side of the circuit including each solenoid may be grounded on the frame of the automobile, the remaining circuits 18, 19, 20 being independent circuits for the respective solenoids. These respective circuits enable each signal to be controlled independently of the remaining signals. The circuit 18 for the "stop" signal 7 is under the control of a switch operated by the brake pedal of the car, said switch being included in a circuit leading to the battery of the car. Thus, when the brake pedal is depressed, the "stop" signal 7 is automatically displayed by the energization of the solenoid 14 controlling the signal 7. The signals 8 and 9 have their circuits 19, 20, including electrical push buttons or switches conveniently located for manipulation by the driver of the car, said circuits running through the battery of the car. These independent push buttons or switches can be manipulated by the driver at will, to display the signals 8 and 9 representing right and left hand turns.

No illustration is given of the switches for the circuits 18, 19, 20 as the energization thereof, in view of the foregoing description, will be obvious.

What is claimed is:

1. In an automobile signal, the combination with a housing having an open part, of a signal arm pivoted to the housing and which may be swung through the open part from an obscured position within the housing to a displayed position projecting from the housing, a contractile coil spring having one end connected to the signal arm and its other end anchored to the housing, said contractile coil spring normally holding the signal arm within the housing and being stretched when the signal arm is swung to displayed position, a solenoid and armature, means flexibly connecting the signal arm and armature for shifting the signal arm from obscured to displayed position in opposition to the retracting action of the spring thereon, and a stop carried by the signal arm in the region of the pivot thereof, which directly engages the tensioned contractile coil spring and thereby arrests the movement of the signal arm when the signal arm has been shifted to displayed position by the solenoid and armature.

2. In an automobile signal, the combination with a pivoted signal arm, of an elongated contractile coil spring anchored at one end and connected at its other end to said signal arm in the general region of its pivot, said coil spring being positioned so that a part of its length will bend around the pivot of the signal arm and thereby cause stretching of the spring when the signal arm is shifted, a stop carried by the signal arm in the region of its pivot which directly engages the tensioned coil spring and arrests the movement of the signal arm when the signal arm has been shifted, and means for shifting the signal arm to displayed position in opposition to the retracting action of the coil spring.

3. In an automobile signal, the combination with a pivoted signal arm adapted to assume a vertical position, or, a horizontally displayed position, of an elongated contractile coil spring anchored at one end and connected at its other end to said signal arm in the region of the pivot thereof and adapted to normally swing the signal arm to vertical position and to hold it there, said coil spring being positioned so that a part of its length will bend around the pivot of the signal arm and thereby cause stretching of the spring when the signal arm is shifted to displayed position, a stop carried by the signal arm in the region of the pivot thereof which directly engages the tensioned coil spring and arrests the movement of the signal arm when the signal arm has been shifted to displayed position, and means co-operating with the signal arm for shifting it to displayed position in opposition to the retracting action of the coil spring.

4. In an automobile signal, the combination with a housing having an open part, of a signal arm pivoted to the housing and which may be swung through the open part from an obscured position within the housing to a displayed position projecting from the housing, a retracting spring connected to the housing and to said signal arm, said spring normally holding the signal arm within the housing and being put under tension when the signal arm is swung to displayed position, a solenoid and armature, means flexibly connecting the signal arm and armature for shifting the signal arm from obscured to displayed position in opposition to the retracting action of the spring thereon, and a stop carried by the signal arm in the region of the pivot thereof which directly engages the tensioned spring and thereby arrests the movement of the signal arm when the signal arm has been shifted to displayed position by the solenoid and armature.

BENJAMIN ALVIN BRANCH.
FRANCIS JOSEPH FELLA.